(12) United States Patent
Bieler

(10) Patent No.: US 9,061,209 B2
(45) Date of Patent: Jun. 23, 2015

(54) INTERCRAFT GAMING

(75) Inventor: Kenneth Hal Bieler, Walnut Creek, CA (US)

(73) Assignee: Virgin America Inc., Burlingame, CA (US)

( * ) Notice: Subject to any disclaimer, the term of this patent is extended or adjusted under 35 U.S.C. 154(b) by 142 days.

(21) Appl. No.: 13/612,360

(22) Filed: Sep. 12, 2012

(65) Prior Publication Data

US 2014/0051498 A1    Feb. 20, 2014

Related U.S. Application Data

(60) Provisional application No. 61/684,676, filed on Aug. 17, 2012.

(51) Int. Cl.
*G06F 17/00* (2006.01)
*A63F 13/30* (2014.01)

(52) U.S. Cl.
CPC ......... *A63F 13/12* (2013.01); *A63F 2300/5566* (2013.01); *A63F 2300/5573* (2013.01)

(58) Field of Classification Search
USPC .................. 463/16–25, 42; 725/1, 76; 705/14
See application file for complete search history.

(56) References Cited

U.S. PATENT DOCUMENTS

| | | | |
|---|---|---|---|
| 2003/0192052 A1 | 10/2003 | Frisco et al. | |
| 2004/0143494 A1* | 7/2004 | Henderson et al. | 705/14 |
| 2005/0222716 A1 | 10/2005 | Tengler et al. | |
| 2006/0242021 A1* | 10/2006 | Pavelle et al. | 705/14 |
| 2011/0143835 A1 | 6/2011 | Sizelove | |

OTHER PUBLICATIONS

Australian Examination Report, Australian Application No. 2012227167, Feb. 1, 2013, 4 pages.

* cited by examiner

*Primary Examiner* — Ronald Laneau
(74) *Attorney, Agent, or Firm* — Fenwick & West LLP

(57) ABSTRACT

A user experience is provided for passengers on a vessel such as an aircraft. A passenger's experience is enhanced by allowing the passenger to join an intercraft gaming session with other passengers aboard another vessel. A passenger aboard a vessel create an intercraft gaming session via an in-flight entertainment device and the system identifies passengers aboard another vessel that are eligible to participate in the intercraft gaming session.

26 Claims, 12 Drawing Sheets

INTERCRAFT GAMING

CROSS-REFERENCE TO RELATED APPLICATIONS

This application claims the benefit of U.S. Provisional Application No. 61/684,676, filed on Aug. 17, 2012, which is incorporated by reference in its entirety.

BACKGROUND

1. Field of Technology

The disclosed embodiments relate generally to a vessel entertainment system, and more specifically to intercraft gaming between aircraft.

2. Description of the Related Art

Many commercial vessels designed to carry passengers include entertainment systems, also known as "IFEs". For example, many airlines operate aircraft that include IFEs mounted in the back of each seat, allowing passengers to watch video, listen to audio programming, order food, and play videos games during the passengers' trip on the aircraft. However, the features available using these conventional devices are limited.

SUMMARY

The embodiments described herein enable an improved user experience for passengers on a vessel such as an aircraft. Specifically, passengers of an aircraft may participate in an intercraft gaming session with one or more passengers on another aircraft. In one embodiment, an intercraft gaming session is associated with a video game in which passengers from different aircraft compete against each other. Passengers are motivated to participate in an intercraft gaming session through prizes that are awarded to winners of the intercraft gaming session.

In one embodiment, a system receives a request to create an intercraft gaming session. The request may be received from a passenger of an aircraft or from an employee of an aircraft. The system identifies passengers from a plurality of aircraft that are eligible to participate in the intercraft gaming session. Eligibility is based on various factors such as whether the passengers are currently airborne, user preferences associated with the passengers, frequent-flier status, etc. The system suggests to the identified passengers from the plurality of aircraft to join the intercraft gaming session. In one embodiment, once the intercraft gaming session is completed, passengers onboard the aircraft that won intercraft gaming session receives a prize.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Figure 1:
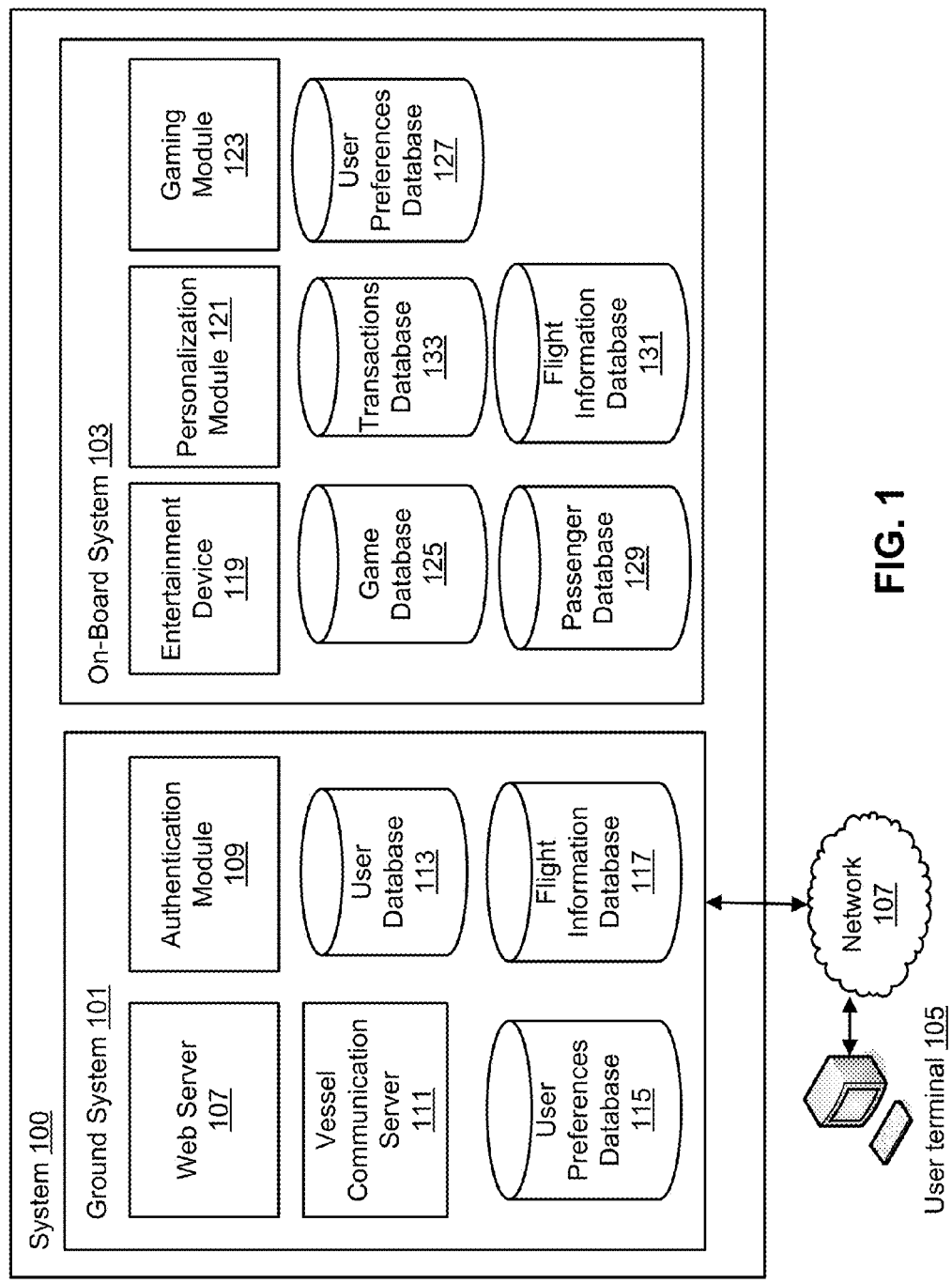
FIG. 1 illustrates a block diagram of a system in accordance with one embodiment.

FIG. 1 illustrates a system 100 for providing intercraft gaming between vessels such as aircraft, trains, ships, or any other forms of mass transportation according to one embodiment. The system 100 allows passengers of different aircraft to participate in intercraft video gaming sessions with each other as a form of in-flight entertainment. In one embodiment, a passenger aboard a first aircraft may request to create an intercraft gaming session via the passenger's IFE. In response to the request, the system 100 identifies passengers aboard a second aircraft that are eligible to participate in the intercraft gaming session and invites the identified passengers to participate in the session. Where passengers aboard the first and second aircraft compete with one another, passengers aboard the winning aircraft may be rewarded with prizes as will be further described below.

Figure 2:
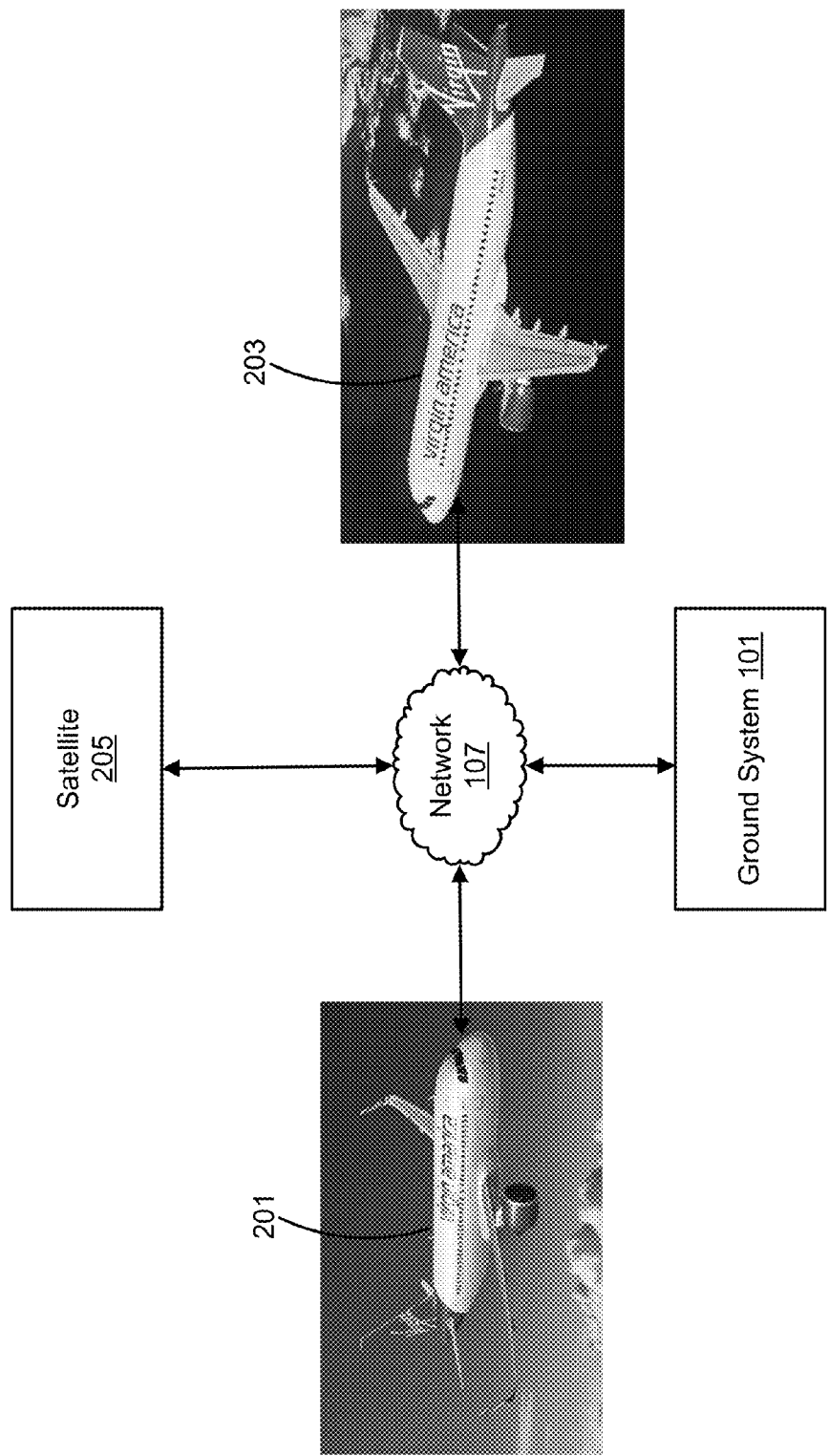
FIG. 2 illustrates an operating environment of the system in accordance with one embodiment.

FIG. 2 illustrates an operating environment for intercraft gaming according to one embodiment. As shown in FIG. 2, aircraft 201 and aircraft 203 are in communication with each other via network 107 such as the Internet or any combination of a LAN, a MAN, a WAN, a mobile, wireless network, a private network, or a virtual private network. Each aircraft 201 and 203 includes an on-board system 103 shown in FIG. 1, as further described below. Aircraft 201 and 203 may communicate with one another using either both of a satellite 205 and the ground system 101.

As shown in FIG. 1, system 100 includes a ground system 101 and an on-board system 103. A user terminal 105 connects to the ground system 101 via the network 107. A user uses the user terminal 105 to communicate with the ground system 101 to reserve and purchase flights from the ground system 101. The user terminal 105 may also be used to establish and maintain a user account with the ground system 101. In one embodiment, the user account includes account information comprising the user's name, mailing address, e-mail address, password, billing information and preferences.

The user terminal 105 may also be used to establish an account for an affinity program such as a frequent-flier account (e.g., Virgin America's Elevate frequent flier program) with the ground system 101. The affinity account is associated with the user's account once established. By establishing an affinity account, the user may obtain benefits associated with the affinity program such as earning points for future flights, in-flight food, in-flight beverages, or in-flight entertainment (e.g., video games, movies, television shows, or music) purchased by the user.

When establishing the affinity account, the user may provide preference settings for association with the affinity account. In one embodiment, the preferences include a default language selection, a default time zone, an accept chats setting, parental controls, interests setting, and a default currency. The default language setting controls the language in which the user interface of entertainment device is displayed. The default time zone setting controls which time zone is used to display content such as an in-flight program guide on the entertainment device. The accept chat requests setting controls whether other passengers aboard an aircraft are able to initiate seat-to-seat chats with the user.

The parental control setting allows or restricts content designated as "adult" from being displayed on an entertainment device. This might include, for example, games, movies, or music rated for an adult audience. The interests settings may include the genre or type of video games that the user is interested in such as first-person shooting games, role playing games, action games, puzzles, board games, etc. The interest settings may also include categories of movies and/or music that interest the user such as action movies or country music. The default currency setting specifies in which currency for-sale items such as video games, movies, food, and catalogue items should be priced.

In one embodiment, each affinity account is associated with an account status. An account status is based on various criteria such as the number of flights purchased by the associated user with the system 100 and/or the amount of money spent by the user with the system 100. For example, a frequent-flier account is initially associated with a "default" status. With a default status, the user must still pay for items during flight such as video games. However, over time the status of the frequent-flier account may be promoted to a higher tier, e.g., "gold" status, based on the criteria described above. Passengers associated with the higher tier status may obtain some items for free during flight, but may still have to pay for other items. For example, passengers with the gold status may obtain free food, but may still have to pay for entertainment such as video games and/or movies. In one embodiment, a frequent-flier account may be promoted to an even higher tier, e.g., "platinum" status, where all items sold during the flight are free of charge to the passengers associated with the account.

While only a single user terminal 105 is shown in FIG. 1, in general very large numbers (e.g., millions) of user terminals are supported and can be in communication with the ground system 101 at any time. The user terminal 105 may be implemented using any of a variety of different computing devices, some examples of which are personal computers, digital assistants, personal digital assistants, cellular phones, mobile phones, smart phones and laptop computers.

As shown in FIG. 1, ground system 101 includes a web server 107, an authentication module 109, a vessel communication server 111, a user database 113, a user preferences database 115, and a flight information database 117. In one embodiment, the web server 107 provides the user interface for a user interacting with the ground system 101 via the user terminal 105. The user interface provided by the web server 107 allows the user to purchase flights, setup a user account, or setup an affinity account as described above.

In one embodiment, the user database 113 stores user account information provided by users when establishing their user accounts. As noted, the account information may include user's name, mailing address, billing address, and/or billing information. The user database 113 may also associate user accounts with their associated affinity accounts established by users. In one embodiment, the user preferences database 115 stores preference settings of users indicated in the user database 113. The preference settings of a user are associated with the user's affinity account stored in the user database 113.

The flight information database 117 stores passenger manifest information for flights associated with system 100. The passenger manifest includes the passengers of flights and information about flights provided by the system 100. The flight information may include the departure time, arrival time, departure location, arrival location, aircraft model, and aircraft specifications, etc.

In one embodiment, the authentication module 109 authenticates users accessing their user accounts or their frequent-flier accounts. The authentication module 126 receives log-in credentials from users such as a log-in name (e.g., an email address) and a password and authenticates the credentials with information stored in the user database 113. Once the authentication module 126 authenticates a user, the user's associated account information is provided to the user terminal 105 to allow the user to view the account information. In one embodiment, the account information may be displayed in a manner that has been customized by the user.

In one embodiment, user preference data is pre-loaded to the on-board system 103 prior to a user's voyage. In one embodiment, the vessel communication server 111 is in communication with the on-board system 103, e.g., while an aircraft is on the ground. Communication may be effected directly through the use of 802.11, WIMAX, or through a ground or satellite based internet service provider, or using, for example, using the Terminal Data Loader (TDL) device from IMS of Anaheim, Calif., which supports wireless communication using 802.11, GSM or CDMA technologies. Alternatively, passenger data may be supplied on CD, DVD, tape, or another medium. Vessel communication server 111 provides a subset of user information from user database 113 corresponding to the passenger manifest indicated in the flight information database 117 and user preferences from user preferences database 115 corresponding to the subset of users to the on-board system 103.

In one embodiment, on-board system 103 includes entertainment devices 119, personalization module 121, gaming module 123, game database 125, transactions database 133, user preferences database 127, passenger database 129, and flight information database 131. Note that in other embodiments, the on-board system 103 may include components other than those shown in FIG. 1. Furthermore, while only a single entertainment device 119 is depicted, this is purely for convenience of illustration. On-board system 101 includes multiple entertainment devices in communication with components of on-board system 103 and with each other as described further below.

Figure 3:
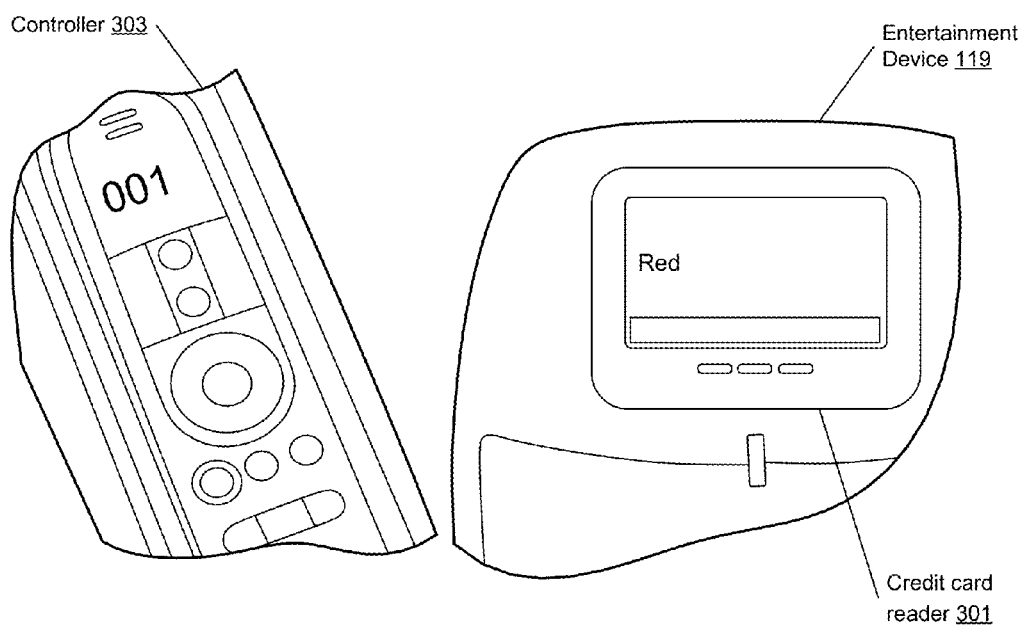
FIG. 3 illustrates an in-flight entertainment device and controller in accordance with one embodiment.

Once on board the vessel, the passenger interacts with the on-board system 103 through the entertainment device 119. FIG. 3 illustrates an example entertainment device 119 and its controller 303. In one embodiment, entertainment device 119 includes a touch screen and is mounted on the back of a seat, such as an aircraft seat. Alternatively, it may be stored in an armrest or in a fold-away position, such as to accommodate rows of seats that do not have other seats in front of them, or where the seat in front is too far to support easy use of an in-seat panel. In other types of vessels such as a ship, the panels may be mounted in staterooms, public areas, restaurant areas, or designated entertainment areas of the ship. The entertainment device 119 also includes a credit card reader 301 for reading credit card information from a credit card in order to purchase in-flight items.

Controller 303 provides an additional method of input for entertainment device 119 in addition to the touch screen. In one embodiment, entertainment device 119 includes hardware adapted to execute software stored on a computer readable medium to provide the functionality described herein.

The passenger may log into the on-board system 119 through entertainment device 119 by providing a login name and optionally a password that is associated with the user's user account and/or affinity account.

Referring back to FIG. 1, the personalization module 121 authenticates the passenger's login information against passenger database 129 that stores user account information. The personalization module 121 may also retrieve the passenger's preference data from on-board user preferences database 127. Personalization module 121 provides the retrieved personalization information to entertainment device 119 and the entertainment device 102 may display a user interface corresponding to the provided preferences. In one embodiment, a default profile is used for passengers who have not established an account, or who have established an account but not provided some or all of the available preference data.

Figure 4:
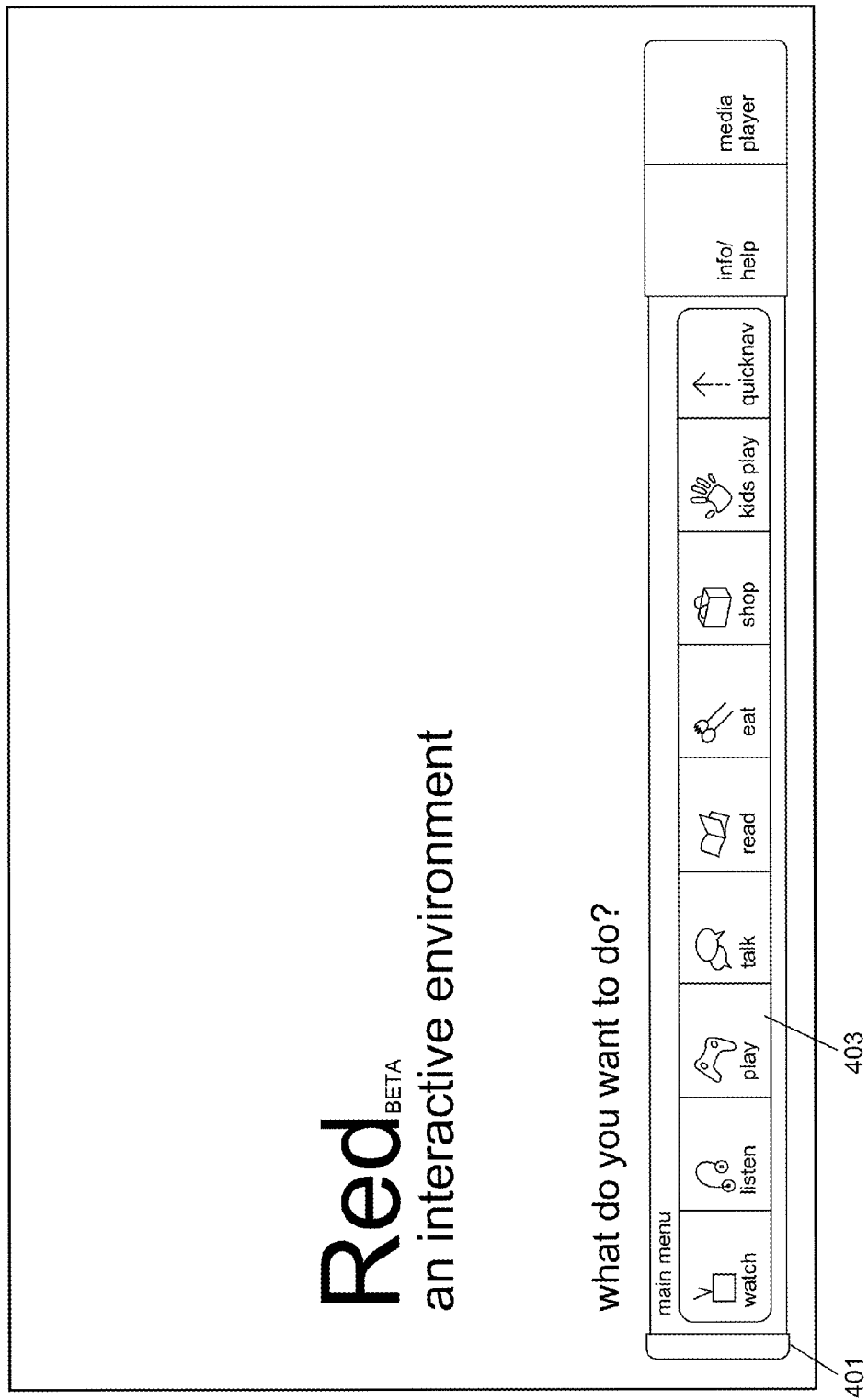
FIG. 4 illustrates a user interface including a navigation menu bar in accordance with one embodiment.

In one embodiment, entertainment device 119 enables passengers to select from a variety of entertainment and service options. Referring to FIG. 4, a passenger can select options on a menu bar 401, including an option to play video games 403. When a passenger chooses the play option 403, a list of available video games is displayed and the passenger selects the video games that the passenger wishes to play.

Figure 5A:
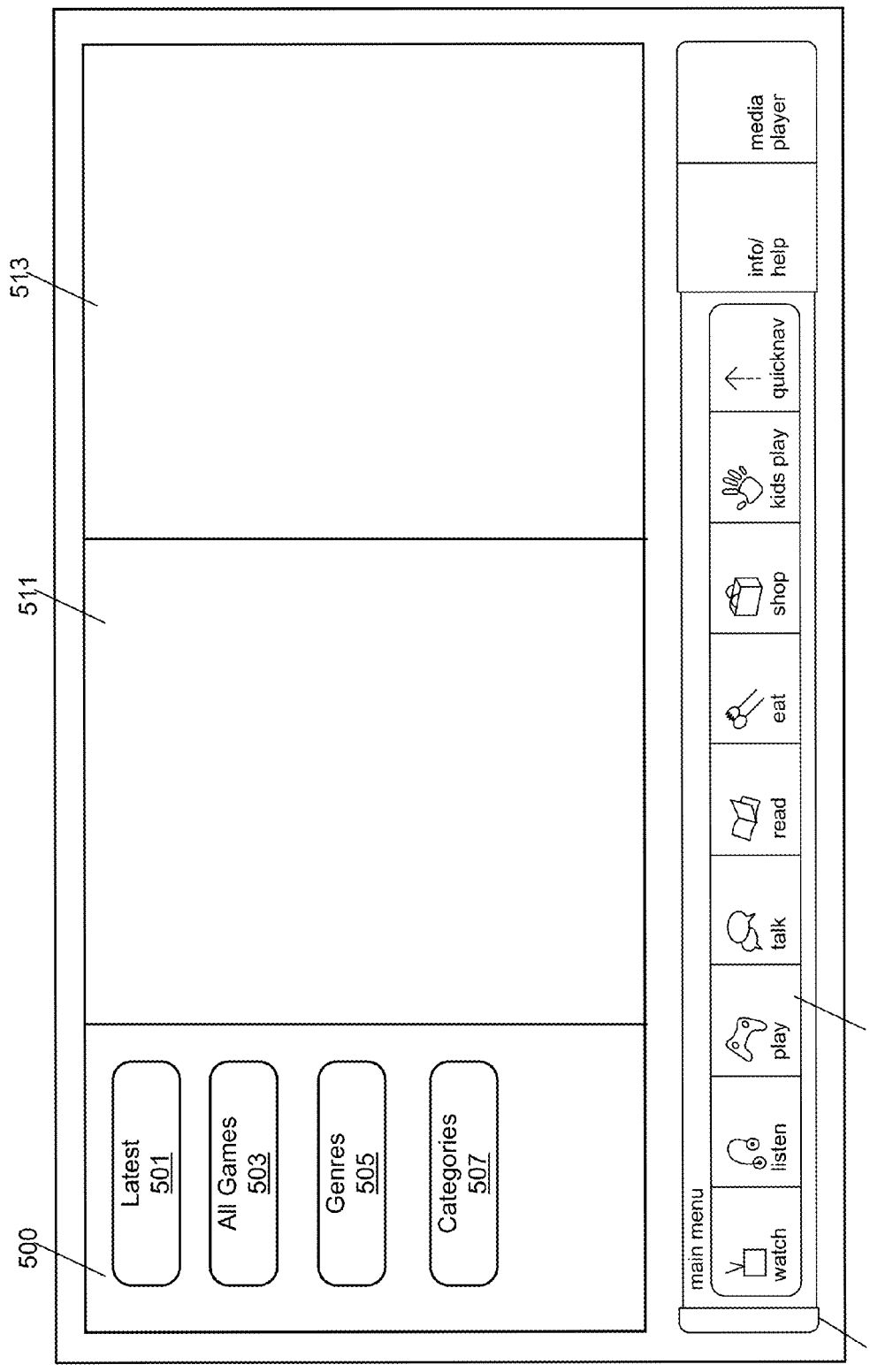
FIGS. 5A through 5G illustrate user interfaces for creating an intercraft gaming session in accordance with one embodiment.

FIG. 5A illustrates one embodiment of a user interface displayed on the entertainment device 119 of a passenger responsive to the passenger's selection of the play option 403 from the menu bar 401. The user interface includes a game options area 500. The game options area 500 displays a plurality of options for viewing video games that are available to the passenger via the entertainment device 119. The sub-options area 511 displays sub-options that are associated with the game options displayed in the game options area 500. The game sub-options area 511 is updated with sub-options that are associated with a selected game option from the game options area 500.

In one embodiment, the game information area 513 displays information about video games. The game information area 513 is updated with information about a game responsive to the selection of a game from the sub-options area 511 by the passenger. In various embodiment, games are offered either free of charge or for a purchase price, depending on which game is selected, the passenger's class of service, affinity status, or other criteria selected by the implementer. As further described with respect to FIG. 5D, a purchase button 509 may be used to select a game to play on the entertainment device 119 even though the game is free of charge.

In one embodiment, the passenger may view a list of the latest available games by selecting, via the entertainment device 119, the latest button 501 that is displayed in the game options area 500. Responsive to the selection of the latest button 501, the sub-options area 511 displays a list of the latest video games that are available to the passenger via the entertainment device 119. The game information area 513 is updated with information about a video game selected from the sub-options area 511.

Alternatively, the passenger may view a list of all the video games that are available on the aircraft by selecting the all games button 503. In response to the passenger's selection of the all games button 503, the sub-options area 511 is updated with a list of all the video games that are available on the aircraft.

The passenger may also view a list of game titles based on genre by selecting the genres button 505. In response to the selection of the genres button 505, the sub-options area 511 displays different genres of games such as sports, trivia, action, role playing, puzzle, racing, etc. The passenger selects a genre of interest from the sub-options area 511 which causes the sub-options area 511 to update with a list of video games of the selected genre.

The passenger may also view a list of games based on game category. In one embodiment, games are categorized as a "team game" requiring intercraft gaming between passengers of at least two aircrafts or between passengers within a single aircraft or an "individual game" where the passenger plays against the computer. A game may also support both categories thus allowing a passenger to play the game against the computer or against others in an intercraft gaming session. Responsive to the selection of the categories button 507, the sub-options area 511 is updated with the different game categories.

Figure 5B:
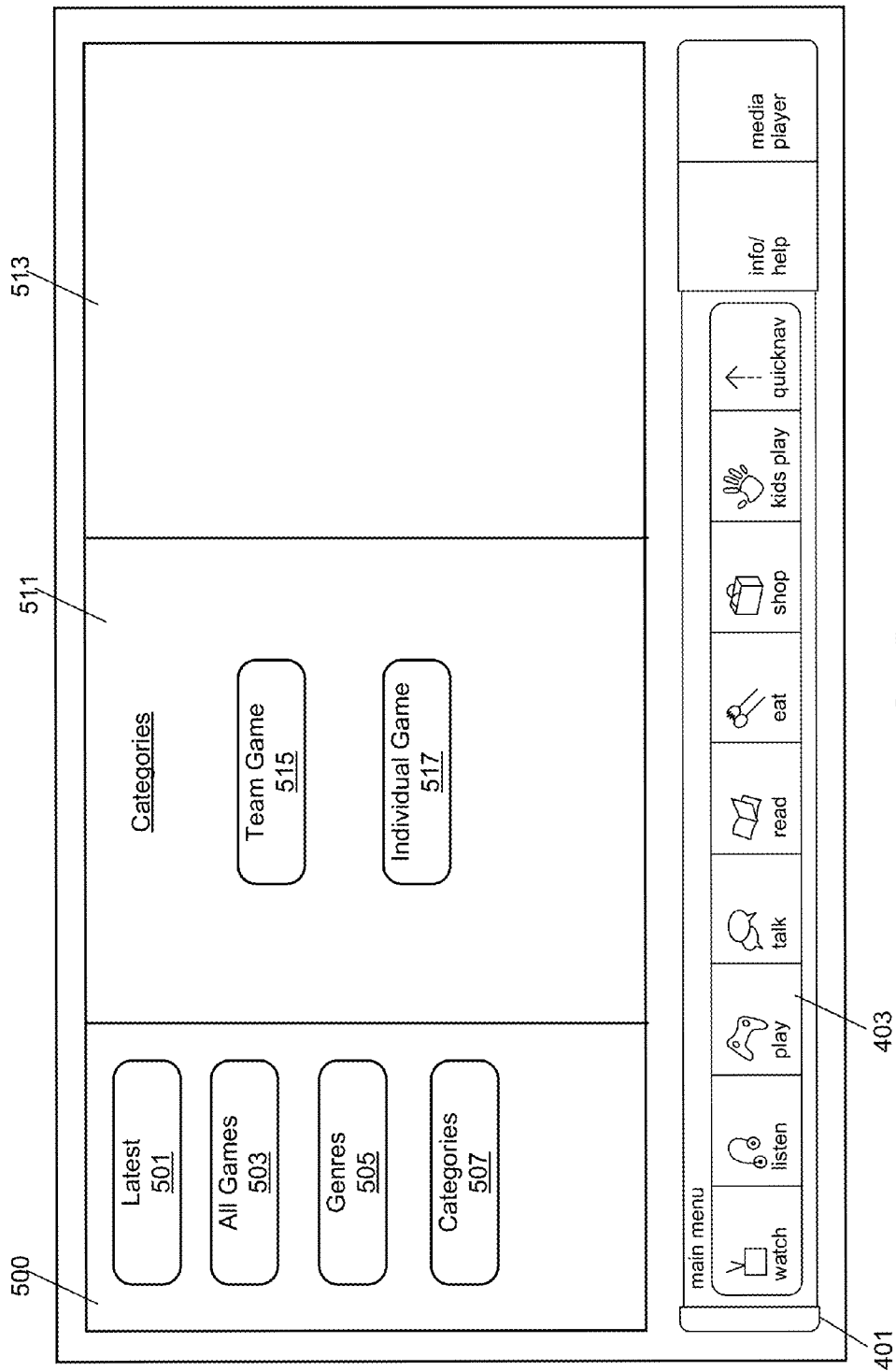

FIG. 5B illustrates the sub-options area 511 that is updated to include the different categories of games responsive to the selection of the categories button 507 by the passenger according to one embodiment. The sub-options area 511 is updated to display a team game button 515 and an individual game button 517. The passenger selects a category from the sub-options area 511 which causes the sub-options area 511 to update with a list of games associated with the selected category.

Figure 5C:
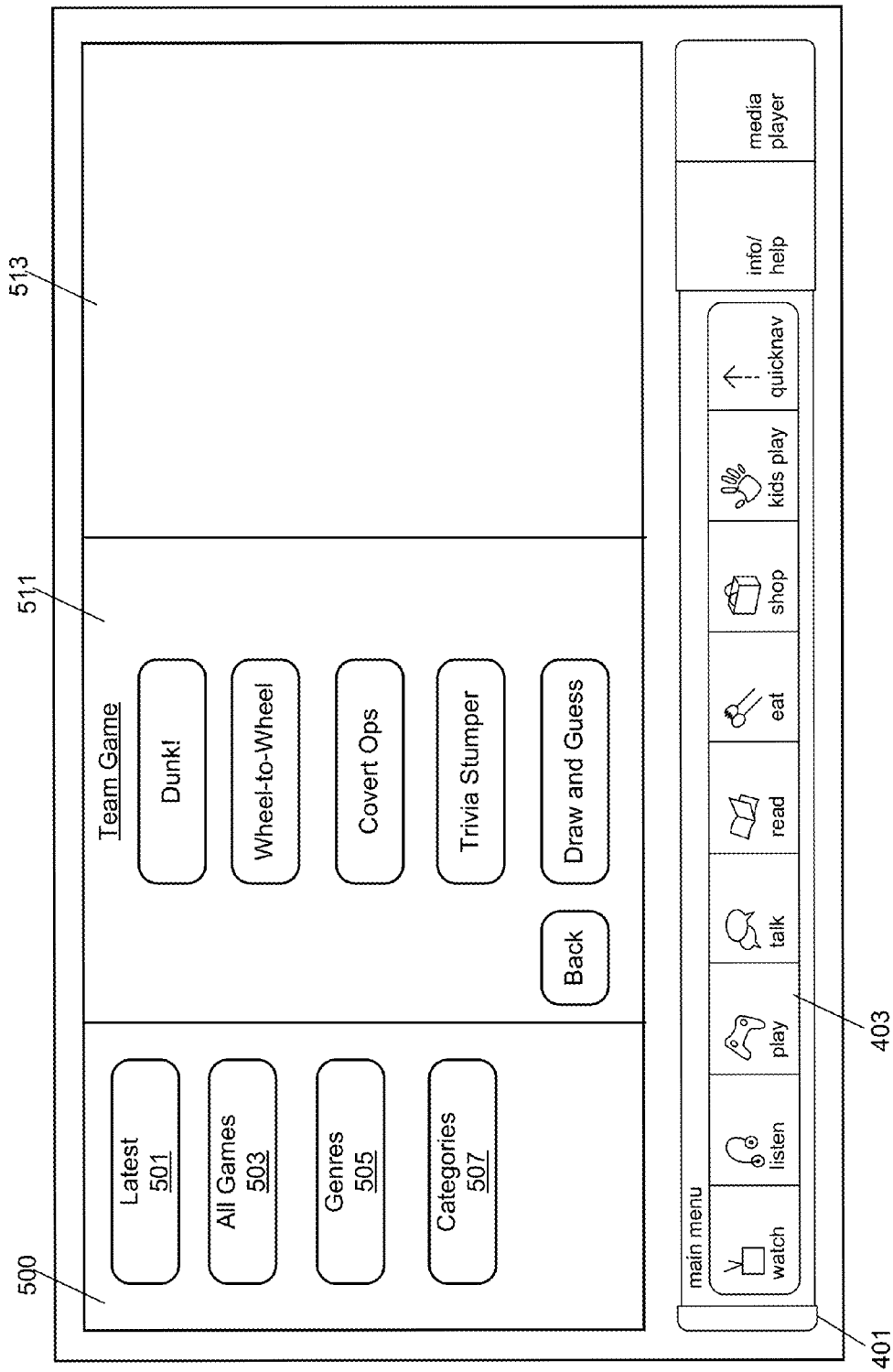

FIG. 5C illustrates the sub-options area 511 that is updated to include a list of games that are categorized as a team game responsive the passenger selecting the team game button 515 (FIG. 5B). For example, the list of games shown in FIG. 5C includes team games such as Dunk!, Wheel-to-Wheel, Covert Ops, Trivia Stumper, and Draw and Guess. The passenger selects a game from the sub-options area 511 via the entertainment device 119 which causes the game information area 513 to update with game information associated with the selected game. The information about the selected game may include a summary of the game, a game rating, and the price to play the game. The passenger may also select the back button to return to the previous user interface illustrated in FIG. 5B.

Figure 5D:
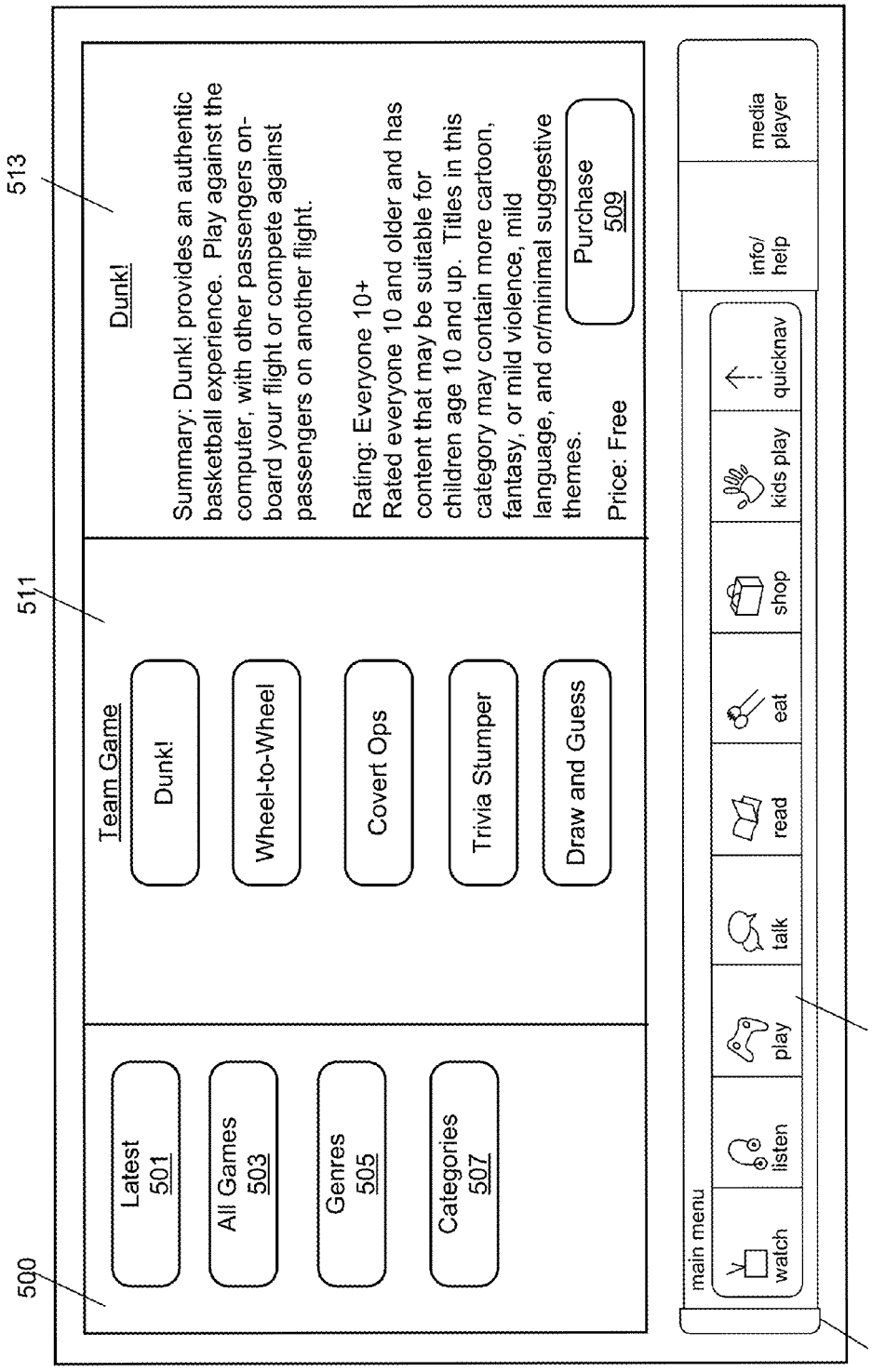

FIG. 5D illustrates the game information area 513 that includes game information about the game Dunk!. The game summary indicates that Dunk! is a basketball game that allows the passenger to play against the computer, other passengers aboard his or her flight, or against passengers on another flight. The game information area 513 also indicates that the price to play Dunk! is free of charge and includes a game rating for Dunk! that states Dunk! is appropriate for everyone 10 and older. The passenger may decide to purchase a game using the purchase button 509. Although not shown, the passenger may be prompted to provide credit card information and/or affinity account information if necessary to pay for the game.

Figure 5E:
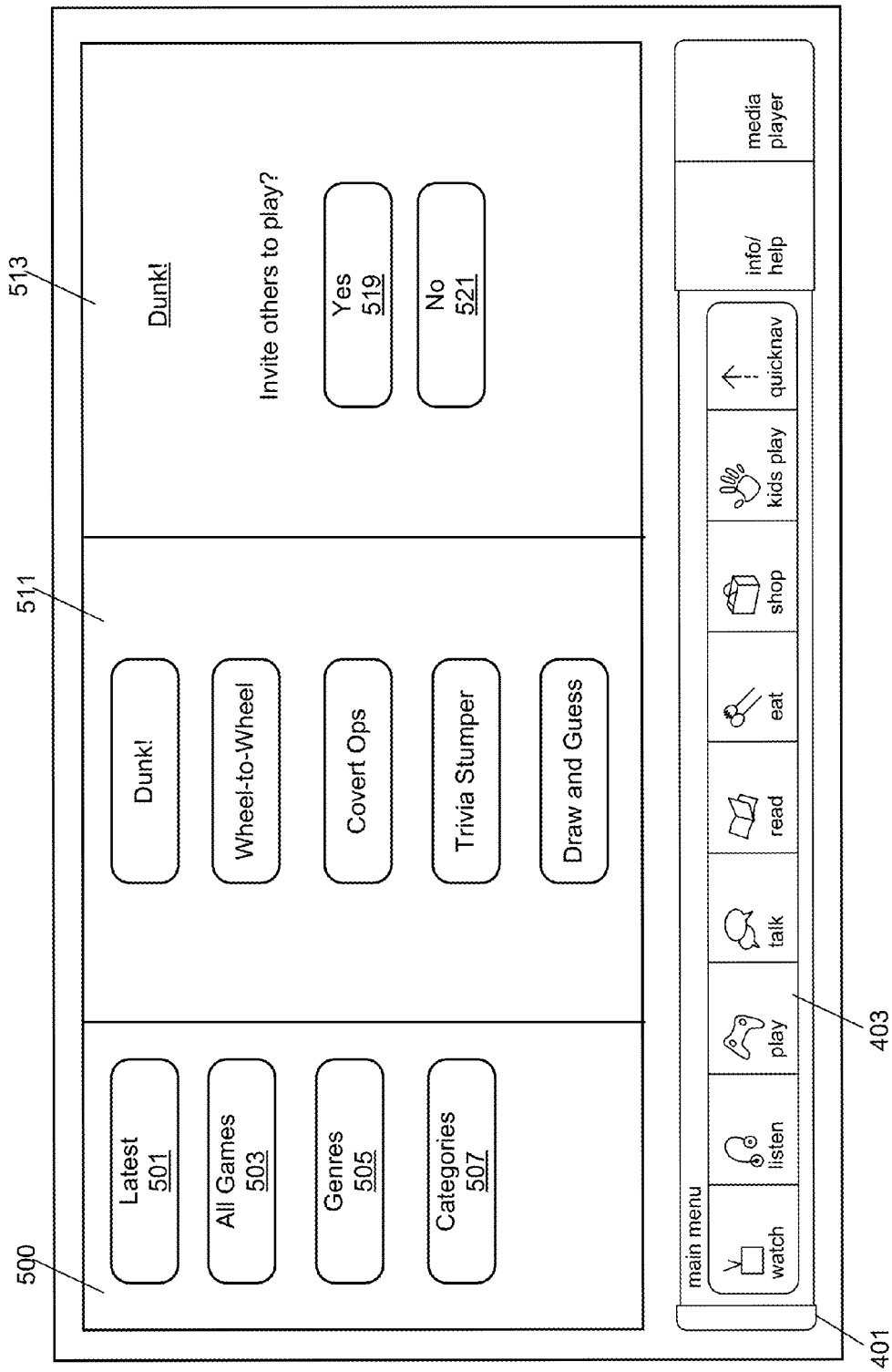
Figure 5F:
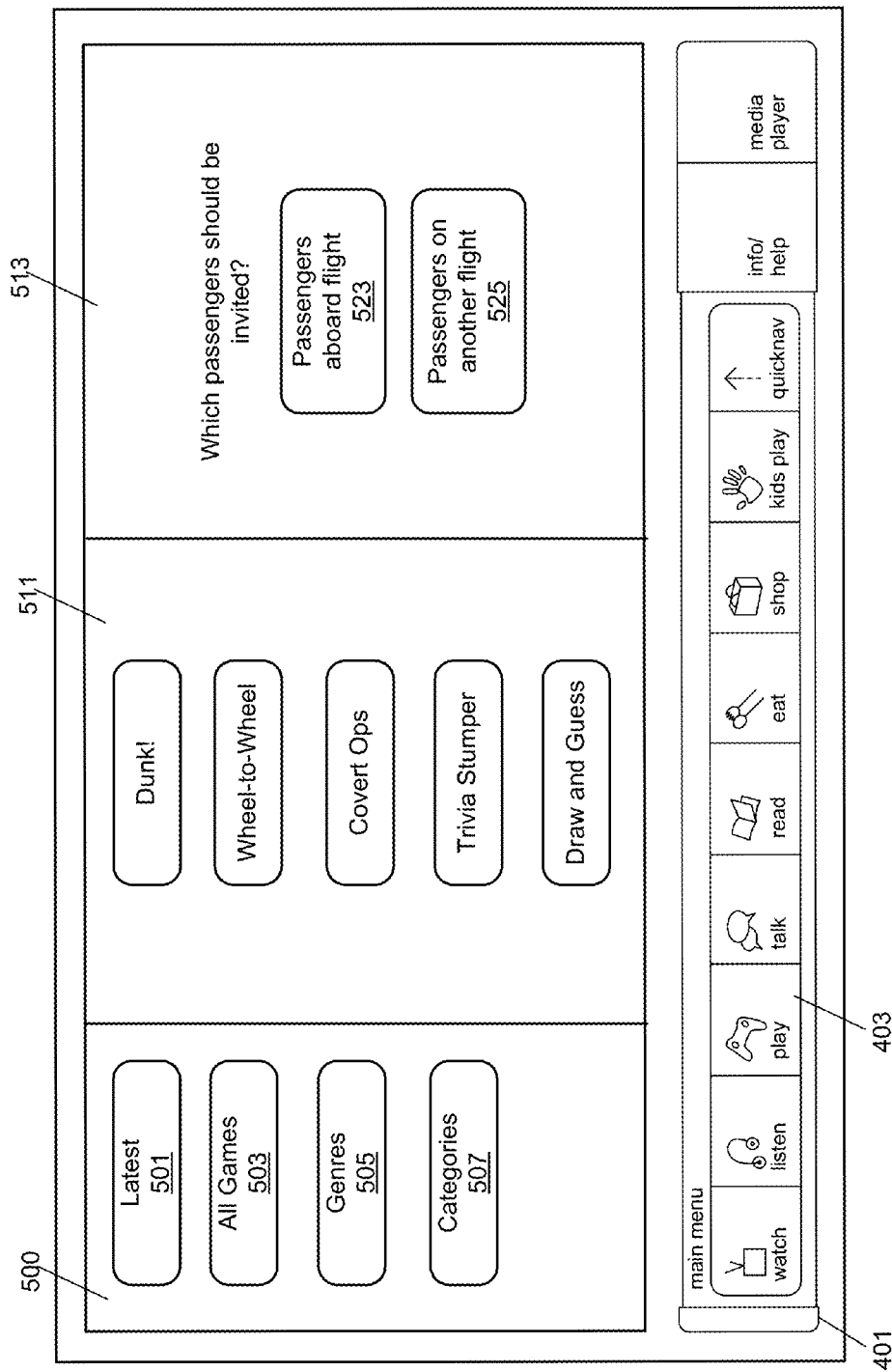

After the game is purchased, the game information area 513 is updated to include a request for instructions whether to invite others to play the game as shown in FIG. 5E. The passenger may elect to invite others to play by selecting the "Yes" button 519 or may elect not to invite others to play by selecting the "No" button 521. The passenger is then prompted for instructions regarding which passengers to invite to participate in the intercraft gaming session for Dunk! as shown in FIG. 5F. The passenger may elect via button 523 for passengers aboard the passenger's flight to participate in the game or the passenger may elect via button 525 for passengers on another flight to participate in the game. In one embodiment, the passenger may view a list of flights and may select a flight from which passengers will be invited to the intercraft gaming session.

Figure 5G:
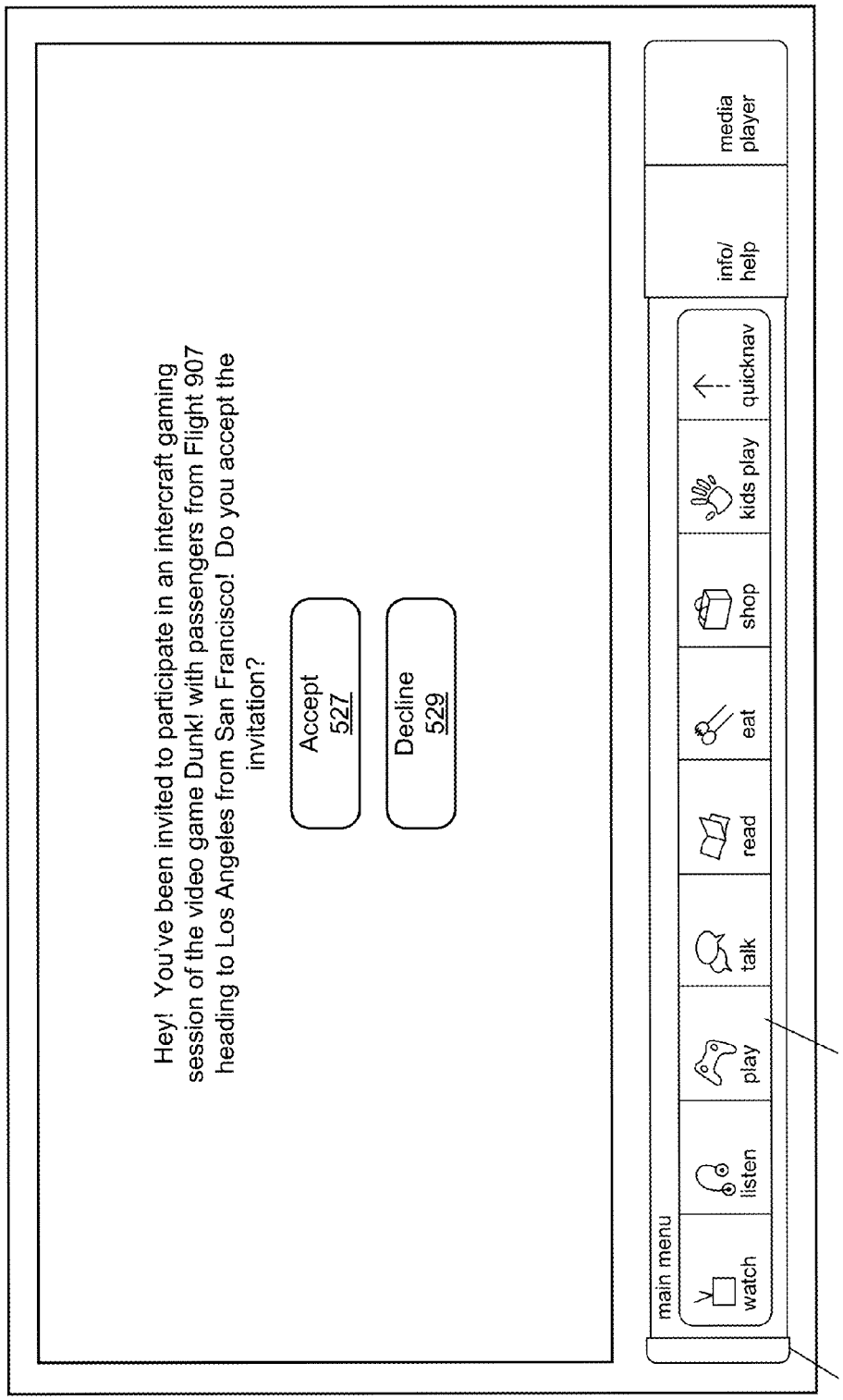

Responsive to the passenger selecting which passengers to invite to the intercraft gaming session, an invitation is sent to passengers that are eligible to participate in the session as described below. FIG. 5G illustrates one embodiment of an invitation to a passenger aboard another flight that has been invited to an intercraft gaming session for the game Dunk!. As shown in FIG. 5G, the notification includes a message indicating the flight, destination, and departure city associated with the aircraft from which the invitation was received. The passenger that received the invitation may accept 527 or decline 529 the invitation to participate in the intercraft gaming session of Dunk!. If the passenger accepts the invitation, the entertainment device 119 of the invited passenger is updated to include the user interface for the game. Note that prior to participating in the intercraft gaming session, the invited passenger may be required to provide payment information if necessary.

Referring back to FIG. 1, in one embodiment the game database 125 stores video games for in-flight play by passengers on the aircraft and game information about each video game. In one embodiment, game information includes a summary of the video game, characters in the video game, the goal of the game, etc. The game information for a video game may further include a game category for the video game that describes whether the game is a "team game" requiring intercraft gaming or an "individual game" where the passenger plays against the computer, or both. Each game may also be associated with a genre such as whether the game is a trivia game, an action game, a puzzle game, a sports game etc. Furthermore, each video game may also have a purchase price to play the video game during the flight.

Each video game may also be associated with a game rating. The game rating provides information about the content in the video game so that passengers can make an informed decision whether to play the game and whether to allow others such as their children to play. For example, the game rating may indicate that the game is rated "everyone" signifying that the game has content that is suitable for ages 6 and older and that the game contains minimal cartoon, fantasy, or mild violence and/or infrequent use of mild language. In another example, the game rating for a game may indicate that the game is rated "mature" indicating that the game may have content that is suitable for passengers ages 17 and older due to the intense violence or strong language included in the video game.

In one embodiment, the gaming module 123 serves via the entertainment device 119 video games stored in the game database 125 to passengers of the aircraft as one form of in-flight entertainment. In response to receiving a selection of a video game from a passenger via the entertainment device 119, the gaming module 123 retrieves summary information associated with the selected game and displays the summary of the video game on the entertainment device 119. After the passenger has reviewed the summary of the video game on the entertainment device 119, the passenger may opt to play or not play the game.

In response to receiving a request to play the video game from the passenger, the gaming module 123 retrieves the video game from the game database 125 for use by the passenger. If a purchase price is associated with the video game and/or the passenger, the gaming module 123 may receive the passenger's credit card information via a credit card reader 301 included in the entertainment device 119 to pay to use the game. In another embodiment, the gaming module 123 may access the passenger's credit card information from the passenger's user account information and/or the passenger's affinity account. Alternatively, the passenger may purchase the game using frequent-flier points accumulated by the passenger. In another embodiment, the gaming module 123 determines whether access to the game is free to the passenger based on the status or tier of the passenger's frequent-flier account. For example, if the passenger's frequent-flier account indicates the "platinum" status, the game may be played for free. Alternatively, the game may be have been pre-purchased by the passenger, for example at reservation time, or may have been credited to the passenger as a compensation for an operational service disruption. Once payment is received, the gaming module 123 provides the selected game to the passenger via the entertainment device 119.

Records of games purchased by passengers are stored in the transactions database 133. Games may be purchased in-flight via the entertainment device 119. Alternatively, a passenger may access a website associated with the airline using the passenger's user terminal 105 prior to the flight and purchase a video game for play during the flight. Transaction information is stored in transactions database 133 for later forwarding, e.g., to a credit card billing system or other data warehouse as desired. The transactions stored in the transactions database 133 may also be used to update passenger frequent-flier accounts. For example, for every dollar a passenger spends on products purchased on a flight, the passenger's frequent-flier account may be credited with some number of points that may be redeemed in the future for flights and/or other items.

In one embodiment, the gaming module 123 provides an intercraft gaming session to passengers of aircraft where at least one passenger in a first aircraft and a second passenger in a second aircraft play a video game with each other in the session. Thus, during intercraft game play, at least two passengers in different aircraft play a video game with each other. For example, a pair of passengers in different aircraft may play a boxing game together. In another example, a group of people in a first aircraft may play a trivia game against another group of people in a second aircraft.

In one embodiment, the gaming module 123 receives a request to create an intercraft gaming session. For example, the request may be received from a passenger of an aircraft via the entertainment device 119. The passenger may select a video game from the entertainment device 119 that requires at least one other passenger from a different aircraft to participate in the video game. Alternatively, the passenger may only indicate a request via the entertainment device 119 to create an intercraft gaming session and the gaming module 123 identifies a list of games that require intercraft gaming. The list of games may then be provided to the passenger on the entertainment device 119 to allow the user to select a game from the list. Alternatively, the gaming module 123 provides a suggestion on the entertainment device 119 of a video game that supports intercraft gaming as well as single-craft gaming (i.e., game play with other passengers in the same aircraft) or single user mode to the passenger. The gaming module 123 may provide the suggestion based on the passenger's user preferences.

In another example, the request to create an intercraft gaming session may be received from an employee of the airline associated with the flight such as the flight attendant. The employee may submit a request to create an intercraft gaming session to allow passengers of different aircraft to compete with each other via a video game. In one embodiment, players aboard the aircraft that wins the game may receive prizes such as free beverage vouchers, frequent-flier points, free food, etc.

Responsive to receiving the request from a passenger or an employee to create an intercraft gaming session with passengers aboard the flight, the gaming module 123 identifies passengers on the flight that are eligible to join the intercraft gaming session. Eligibility to participate in the intercraft gaming session is based on various factors. For example, the gaming module 123 may access the user preferences database 127 to identify passengers indicating an interest in the genre of game associated with the intercraft gaming session selected by the user or the employee. The gaming module 123 may also identify from the user preferences database 127 passengers that are allowed to play games with the particular game rating associated with the intercraft gaming session. For example, if the intercraft gaming session is rated "mature", the gaming module 123 identifies passengers that are allowed (i.e., not prohibited) to play games with the "mature" rating. Furthermore, if the gaming session requires payment to play the game, the gaming module 123 may identify from the passenger database 129 passengers with a frequent-flier account status allowing for free gameplay or those passengers that have enough points to play the game. For example, the gaming module 123 may identify passengers with a "platinum" status associated with their frequent-flier account.

In one embodiment, the gaming module 123 identifies passengers in one or more other aircraft (e.g., 3 aircrafts) that are eligible to participate in the intercraft gaming session responsive to a request for intercraft gaming with other aircraft as described with respect to FIG. 5F. Alternatively, the gaming module 123 may automatically identify eligible passengers in one or more aircraft for participation in the intercraft gaming session.

Particularly, the gaming module 123 identifies other passengers that are currently in-flight on another aircraft. In one embodiment, the gaming module 123 identifies another aircraft that is within a threshold distance of the aircraft or may identify any aircraft that is in-flight. The gaming module 123 accesses the flight information database 131 that stores passenger manifest information of flights associated with the system 100 similar to the flight information database 117 of the ground system 101. From the passenger manifest information, the gaming module 123 can identify a set of passengers from another aircraft or from multiple aircraft that are currently in-flight. The gaming module 123 then identifies a subset of the set of passengers that are currently in-flight that are eligible to participate in the intercraft gaming session based on the various criteria mentioned above such as game rating, user preferences, frequent-flier account status, etc.

Once the passengers that are eligible for the intercraft gaming session are identified, the gaming module 123 provides a suggestion for each identified passenger to join the intercraft gaming session. In one embodiment, the gaming module 123 communicates the suggestion to another gaming module located in the entertainment device of the identified passenger in the other aircraft. The gaming module on the other aircraft displays the suggestion on the entertainment device of each identified passenger to join the intercraft gaming session. In one embodiment, the suggestion may also describe an incentive to join the intercraft gaming session. For example, the incentive may indicate that the passenger or the aircraft that wins the intercraft gaming session may receive a prize for participating in the game and winning.

The gaming module 123 receives an indication from the invited passengers whether the invitation to join the intercraft gaming session is accepted or declined. In one embodiment, the gaming module 123 automatically receives an indication that the invitation is declined if a response from a passenger is not provided by a threshold amount of time (e.g., 5 minutes). The gaming module 123 then creates an intercraft gaming session with the passengers that accepted the invitation to participate in the intercraft gaming session.

Once the game is concluded, the gaming module 123 may update the passenger database 129 with an indication of the passengers on the winning team. The indication may include a prize for each passenger as previously described above such as frequent-flier points.

In another embodiment for creating an intercraft gaming session, the gaming module 123 automatically identifies a list of video games requiring intercraft gaming during a flight. The list of video games is provided to passengers onboard at least one pair of aircraft. The gaming module 123 receives a selection of one or more video games from at least one passenger from each of the aircraft. For each selected video game, the gaming module 123 creates an intercraft gaming session between at least one passenger from a first aircraft that selected the video game and at least one passenger from a second aircraft that also selected the video game.

Figure 6:
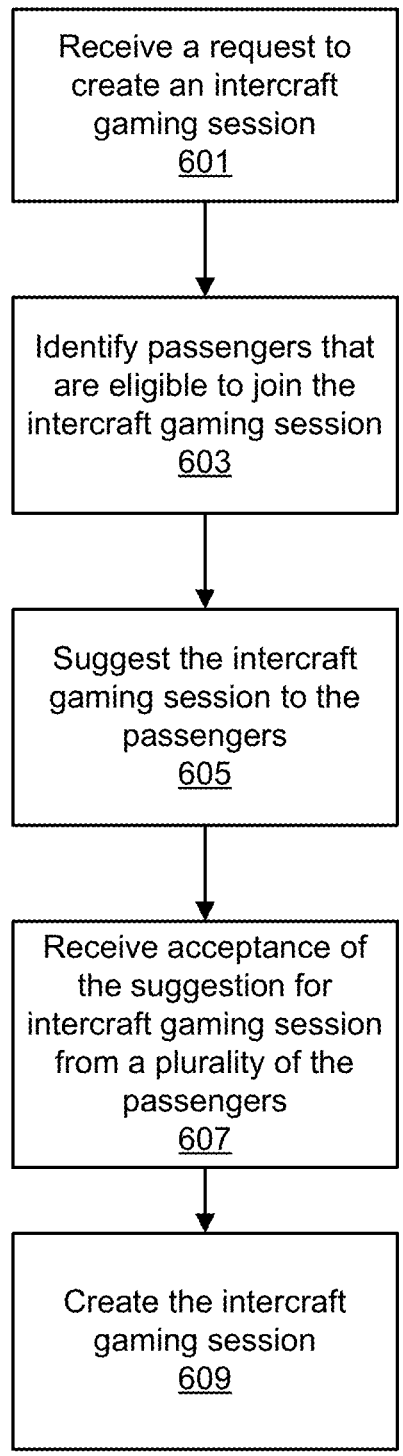
FIG. 6 illustrates a method for creating an intercraft gaming session in accordance with one embodiment.

Referring now to FIG. 6, one embodiment of a method for creating an intercraft gaming session is shown. Note that in other embodiments, the method for creating an intercraft gaming session may include other steps than those shown in FIG. 6.

On-board system 103 receives 601 a request to create an intercraft gaming session. As noted above, the request may come from a passenger aboard an aircraft, an in-flight crew member, or may be preconfigured to occur at a specific time or location of the aircraft. The on-board system 103 identifies 603 the passengers that are eligible for the intercraft gaming session responsive to the request. More specifically, the on-board system 103 identifies passengers from another aircraft that are eligible to participate in the gaming session. The on-board system 103 suggests 605 the intercraft gaming session to the identified passengers. The on-board system 103 then receives 607 an acceptance of the suggestion for intercraft gaming from a plurality of the passengers that received the suggestion. The on-board system 103 creates 609 the intercraft gaming session for the passengers that accepted the suggestion.

In addition to the games discussed above that are eligible for intercraft gaming sessions, passengers aboard different aircraft may participate in geographically relevant, or geotainment, games. In one geotainment game, passengers aboard different aircraft that are en route to the same destination may compete in a virtual scavenger hunt. Alternatively, passengers aboard different aircraft that have overlapping paths of travel to destinations within a threshold distance, e.g., within 100 miles, may compete in a virtual scavenger hunt.

For example, passengers aboard aircraft that are playing the geotainment game identify via the entertainment device 119 items that are embedded in a virtual representation of the physical world over which their aircraft is flying. During game play, the entertainment device 119 automatically provides items to a passenger that are representative of geographical locations or facts related to geographic locations over which the aircraft is flying and the passenger provides a response to the entertainment device 119 related to the items.

For example, an item may be displayed in the virtual representation of the physical world and the passenger may identify the name of the geographical location associated with the item. Alternatively, the passenger may answer a trivia question regarding a fact that is related to the location. In another embodiment, the passenger may be provided an option to either identify the geographic location associated with an item or answer the trivia question corresponding to the geographic location. The item may also be associated with locations related to advertising or commercial landmarks that are derived from offers, coupons, or other opportunities that the system 100 is promoting.

In one embodiment, the items are represented as icons that are visually indicative of the type of landmark associated with a geographic location. In one example, a bridge icon may be displayed as the aircraft flies over San Francisco and the passenger can then identify that the bridge icon as associated with the landmark "Golden Gate Bridge." In another example, a building icon is displayed to represent landmark buildings such as the Empire State Building.

As a result of correctly identifying the location associated with the icon, the passenger may accumulate points. In one embodiment, points may be distributed based on item type. For example, users may be awarded more points for answering questions related to facts of geographic locations correctly rather than identifying names of geographical locations. When the aircraft reach their destination, passengers aboard the winning aircraft that participated in the geotainment game may receive a prize. Alternatively, only the passenger with the highest score from among both aircrafts may receive a prize. In another embodiment, a passenger from each aircraft with the highest score may receive a prize.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method for creating an intercraft gaming session, the method comprising:
   receiving, from a device of a user, a request to create an intercraft gaming session for a video game;
   accessing flight information to identify a plurality of aircraft that are currently in flight;
   identifying, by a computer, a subset of passengers aboard the plurality of aircraft that are eligible to join the intercraft gaming session, each passenger having an in-flight entertainment (IFE) device for joining the intercraft gaming session; and
   creating the intercraft gaming session including the IFE devices of the identified passengers that allows the identified passengers to participate in the video game via the IFE devices.

2. The method of claim 1, wherein the user is a passenger aboard one of the plurality of aircraft and the device is an IFE of the passenger, and the request to create the intercraft gaming session is received from the IFE of the passenger.

3. The method of claim 1, wherein the user is an employee onboard one of the plurality of aircraft and the request to create the intercraft gaming session is received from the device of the employee.

4. The method of claim 1, wherein identifying the subset of passengers from the plurality of aircraft that are eligible to join the intercraft gaming session comprises:
   identifying a genre associated with the video game; and
   identifying from passenger profile information passengers that are interested in the identified genre.

5. The method of claim 1, wherein identifying the subset of passengers from the plurality of aircraft that are eligible to join the intercraft gaming session comprises:
   identifying a game rating associated with the video game; and
   identifying from passenger profile information passengers that are allowed to play video games associated with the identified game rating.

6. The method of claim 1, wherein identifying the subset of passengers from the plurality of aircraft that are eligible to join the intercraft gaming session comprises:

identifying a purchase price associated with the video game; and
identifying passengers comprising a plurality of frequent flier points that may be used to purchase the video game, the plurality of frequent flier points equivalent to the purchase price.

7. The method of claim 1, wherein identifying the subset of passengers from the plurality of aircraft that are eligible to join the intercraft gaming session comprises:
identifying a purchase price associated with the video game; and
identifying passengers associated with a frequent flier account status indicating that the purchase price associated with the video game is waived.

8. The method of claim 1, wherein accessing the flight information comprises:
requesting the flight information from a ground station associated with the plurality of aircraft.

9. The method of claim 1, wherein accessing the flight information comprises:
requesting the flight information from the plurality of aircraft.

10. The method of claim 1, further comprising:
providing an invitation to the IFE devices of the identified passengers of the plurality of aircraft to join the intercraft gaming session; and
receiving acceptance of the invitation from the IFE devices of the identified passengers.

11. The method of claim 10, wherein the invitation comprises incentives to participate in the intercraft gaming session.

12. The method of claim 11, wherein the incentives comprise at least one of beverage vouchers, food vouchers, entertainment vouchers, frequent-flier points, or discounted future airfare.

13. The method of claim 10, further comprising:
providing the incentives to a plurality of the passengers that won the intercraft gaming session.

14. A method for gaming, the method comprising:
determining, by a computer aboard a first aircraft or a second aircraft, a plurality of games to make available to a plurality of passengers of the first aircraft and the second aircraft, each passenger of the first aircraft and the second aircraft having an in-flight entertainment (IFE) device;
providing indicia of the plurality of games to the IFE device of each of the plurality of passengers onboard the first aircraft and the second aircraft;
receiving a selection of one of the plurality of games from the IFE device of at least one passenger onboard the first aircraft and the second aircraft; and
establishing a gaming session between the first aircraft and the second aircraft from whom the selection was received.

15. A method for providing intercraft gaming, the method comprising:
receiving, by a ground system computer in communication with a first aircraft and a second aircraft, a request from the first aircraft to instantiate a game between the first aircraft and another aircraft;
accessing, by the ground system computer, a flight information database comprising flight information about aircrafts currently in flight;
identifying, by the ground system computer, the second aircraft eligible to participate in the game from the flight information about aircrafts currently in flight; and
instructing, by the ground system computer, the first aircraft and the second aircraft to participate in the game;
wherein each of a plurality of passengers aboard the first aircraft and the second aircraft have an in-flight entertainment device through which each passenger participates in the game.

16. A non-transitory computer-readable storage medium comprising executable code for providing intercraft gaming, the code when executed causing a computer to perform steps comprising:
receiving, from a device of a user, a request from a passenger of an aircraft to view a list of video games via an in-flight entertainment (IFE) device;
providing the list of video games for display on the IFE device responsive to receiving the request;
receiving from the passenger via the IFE device a selection of a video game from the list of video games;
prompting the passenger to provide an indication of a subset of passengers aboard another aircraft to invite to join an intercraft gaming session of the selected video game, each of the passengers having an IFE device;
receiving from the IFE device of the passenger an indication to invite the subset of passengers aboard another aircraft to join the intercraft gaming session of the selected video game;
transmitting an invitation to the another aircraft inviting the subset of passengers aboard the another aircraft to participate in the intercraft gaming session via the IFE device of each of the passengers.

17. The non-transitory computer-readable storage medium of claim 16, wherein the code when executed perform further steps comprising:
providing the intercraft gaming session of the selected video game to the passenger on the IFE device.

18. The non-transitory computer-readable storage medium of claim 16, wherein providing the list of video games comprises:
providing one or more categories of video games for display on the IFE device;
receiving a selection of a category from the passenger via the IFE device; and
providing the list of video games of the selected category for display on the IFE device.

19. The non-transitory computer-readable storage medium of claim 18, wherein the selected category of video games requires intercraft gaming.

20. The non-transitory computer-readable storage medium of claim 16, wherein the code when executed perform further steps comprising:
providing information about the selected video game for display on the IFE device responsive to the selection of the video game from the list of video games;
wherein the information comprises at least one of a summary of the selected video game, a game rating associated with the selected video game, or a purchase price to play the selected video game.

21. A method for creating an intercraft gaming session between aircrafts, the method comprising:
receiving, via an in-flight entertainment (IFE) device of a passenger aboard a first aircraft, a request to create an intercraft gaming session of a video game with a second aircraft specified by the passenger;
identifying, by a computer, a subset of passengers from the second aircraft that are eligible to join the intercraft gaming session based on a game rating of the video game, each passenger having an IFE device for joining the intercraft gaming session;

transmitting an invitation to the second aircraft inviting the identified passengers to join the intercraft gaming session;

receiving, from the second aircraft, an acceptance of the invitation from each IFE device of one or more of the identified passengers aboard the second aircraft; and creating the intercraft gaming session including the IFE device of the passenger aboard the first aircraft and the IFE device of each one or more of the identified passengers aboard the second aircraft that accepted the invitation.

22. The method of claim 21, further comprising:

receiving a request from the passenger aboard the first aircraft to view a list of video games via the IFE device of the passenger;

providing the list of video games for display on the IFE device responsive to receiving the request; and receiving, via the IFE device of the passenger aboard the first aircraft, a selection of the associated video game from the list.

23. The method of claim 21, further comprising:

receiving payment for the associated video game.

24. The method of claim 23, wherein the payment comprises frequent flier points of the passenger that is equivalent to a purchase price of the associated video game.

25. The method of claim 21, wherein identifying passengers aboard the second aircraft that are eligible to join the intercraft gaming session is further based on a genre associated with the video game.

26. A ground system for creating an intercraft gaming session, the ground system comprising:

a flight information database comprising information about aircrafts currently in flight;

a non-transitory processor; and a non-transitory computer-readable storage medium storing executable code, the code when executed by the processor performs steps comprising:

receiving a request from a first aircraft to instantiate a game between the first aircraft and another aircraft;

accessing the flight information database to identify flight information about aircrafts currently in flight;

identifying a second aircraft eligible to participate in the game based on the flight information about aircrafts currently in flight; and instructing the first aircraft and the second aircraft to participate in the game;

wherein each of a plurality of passengers aboard the first aircraft and the second aircraft have an in-flight entertainment device through which each passenger participates in the game.

\* \* \* \* \*